(12) United States Patent
Martínez Corral et al.

(10) Patent No.: US 12,253,689 B2
(45) Date of Patent: Mar. 18, 2025

(54) MULTIPERSPECTIVE PHOTOGRAPHY CAMERA DEVICE

(71) Applicant: UNIVERSITAT DE VALÈNCIA, València (ES)

(72) Inventors: Manuel Martínez Corral, València (ES); Genaro Saavedra Tortosa, València (ES); Gabriele Scrofani, València (ES); Emilio Sánchez Ortiga, València (ES)

(73) Assignee: UNIVERSITAT DE VALÈNCIA, València (ES)

( * ) Notice: Subject to any disclaimer, the term of this patent is extended or adjusted under 35 U.S.C. 154(b) by 162 days.

(21) Appl. No.: 18/251,154

(22) PCT Filed: Oct. 27, 2021

(86) PCT No.: PCT/EP2021/079900
§ 371 (c)(1),
(2) Date: Apr. 28, 2023

(87) PCT Pub. No.: WO2022/090352
PCT Pub. Date: May 5, 2022

(65) Prior Publication Data
US 2023/0421872 A1    Dec. 28, 2023

(30) Foreign Application Priority Data

Oct. 29, 2020    (EP) .................................... 20382942

(51) Int. Cl.
*H04N 7/18* (2006.01)
*G02B 3/00* (2006.01)
(Continued)

(52) U.S. Cl.
CPC ................ *G02B 3/005* (2013.01); *G06T 7/50* (2017.01); *G06T 2207/10028* (2013.01)

(58) Field of Classification Search
CPC ...... G02B 3/005; G02B 27/0075; G06T 7/50; G06T 2207/10028; H04N 23/51; H04N 23/55; H04N 23/957
See application file for complete search history.

(56) References Cited

U.S. PATENT DOCUMENTS 7,463,280 B2 * 12/2008 Steuart, III ............ H04N 23/51
  348/42
8,390,821 B2 *  3/2013 Shpunt .................... G02B 5/18
  356/512

(Continued)

FOREIGN PATENT DOCUMENTS

CN          111487759          8/2020
WO          2020/030841        2/2020

OTHER PUBLICATIONS

E. H. Adelson and J. R. Bergen, "The plenoptic function and the elements of early vision," in Computational Models of Visual Processing, L. M. and J. Movshon, eds. (MIT Press, Camdridge. MA, 1991), pp. 3-20.

(Continued)

*Primary Examiner* — Howard D Brown, Jr.
(74) *Attorney, Agent, or Firm* — ICE MILLER LLP (57) ABSTRACT

The present invention relates to a multi perspective photography camera device, for capturing perspective images of a macroscopic 3D scene, comprising: —a hollow casing (10a-10b, 11, 13) housing: —a lens array (8) to be placed at a conjugate plane of an aperture diaphragm (2) of a photographic objective (OB), between the photographic objective (OB) and a photosensitive pixel array sensor (9), to simultaneously receive and transmit to the sensor (9) light representative of a plurality of different perspectives of the macroscopic 3D scene (S), one perspective per array lens; —a field diaphragm (5) to be placed at a plane where an image provided by said photographic objective (OB) is to be (Continued)

formed; and—a converging lens (6) having a focal length $f_R$, and that is placed between the field diaphragm (5) and the lens array (8), at a distance equal to $f_R$ from the field diaphragm (5).

15 Claims, 7 Drawing Sheets (51) Int. Cl.
*G02B 27/10* (2006.01)
*G06T 7/50* (2017.01)

(56) References Cited

U.S. PATENT DOCUMENTS

| | | | |
|---|---|---|---|
| 8,724,014 B2 | 5/2014 | Ng et al. | |
| 9,113,043 B1* | 8/2015 | Kim | G06T 15/08 |
| 2008/0124070 A1 | 5/2008 | Liang et al. | |
| 2009/0244309 A1* | 10/2009 | Maison | A63F 13/213 |
| | | | 348/222.1 |
| 2010/0020187 A1* | 1/2010 | Georgiev | H04N 23/959 |
| | | | 348/340 |
| 2010/0141802 A1 | 6/2010 | Knight et al. | |
| 2015/0103146 A1 | 4/2015 | Rose et al. | |
| 2022/0270210 A1* | 8/2022 | Lee | G06T 5/00 |

OTHER PUBLICATIONS

E. H. Adelson and J. Y. A. Wang, "Single lens stereo with a plenoptic camera," IEEE Trans. Pattern Anal. Mach. Intell. pp. 99-106 (1992).
R. Ng, M. Levoy, M. Brédif, G. Duval, M. Horowitz, and P. Hanrahan, "Light field photography with a hand-held plenoptic camera," Tech. rep., Standford University (2005).
R. Lange, P. Seitz, A. Biber and R. Schwarte, "Time-of-flight range imaging with a custom solid-state image sensor," Laser Metrology Inspection, vol. 3823, pp. 180-191, 1999.
Martinez-Corral, Manuel, et al. "Integral imaging with Fourier-plane recording." Three-Dimensional Imaging, Visualization, and Display 2017. vol. 10219. SPIE, 2017.
Jiang, Xiaoli, Yao Hu, and Zhuo Chen. "Hardware implement of high resolution light field microscopy." AOPC 2017: 3D Measurement Technology for Intelligent Manufacturing. vol. 10458. SPIE, 2017.
European Search Report issued in EP 20 38 2942, dated Feb. 26, 2021.
International Search Report issued in PCT/EP2021/079900, mailed Feb. 23, 2022.

* cited by examiner

MULTIPERSPECTIVE PHOTOGRAPHY CAMERA DEVICE

CROSS-REFERENCE TO RELATED PATENT APPLICATIONS

This is a U.S. National Phase Application under 35 U.S.C. § 371 of International Patent Application No. PCT/EP2021/079900, filed Oct. 27, 2021, and claims priority to EP 20382942.9, filed Oct. 29, 2020, which is incorporated by reference in its entirety. The International Application was published on May 5, 2022, as International Publication No. 2022/090352 A1.

FIELD OF THE INVENTION

The present invention generally relates to a multiperspective photography camera device, and more specifically to a multiperspective photography camera device made to provide directly and simultaneously, i.e. with a single shot, a set of high resolution images with different perspectives of a macroscopic 3D scene, along a high field of view.

BACKGROUND OF THE INVENTION

Figure 1:
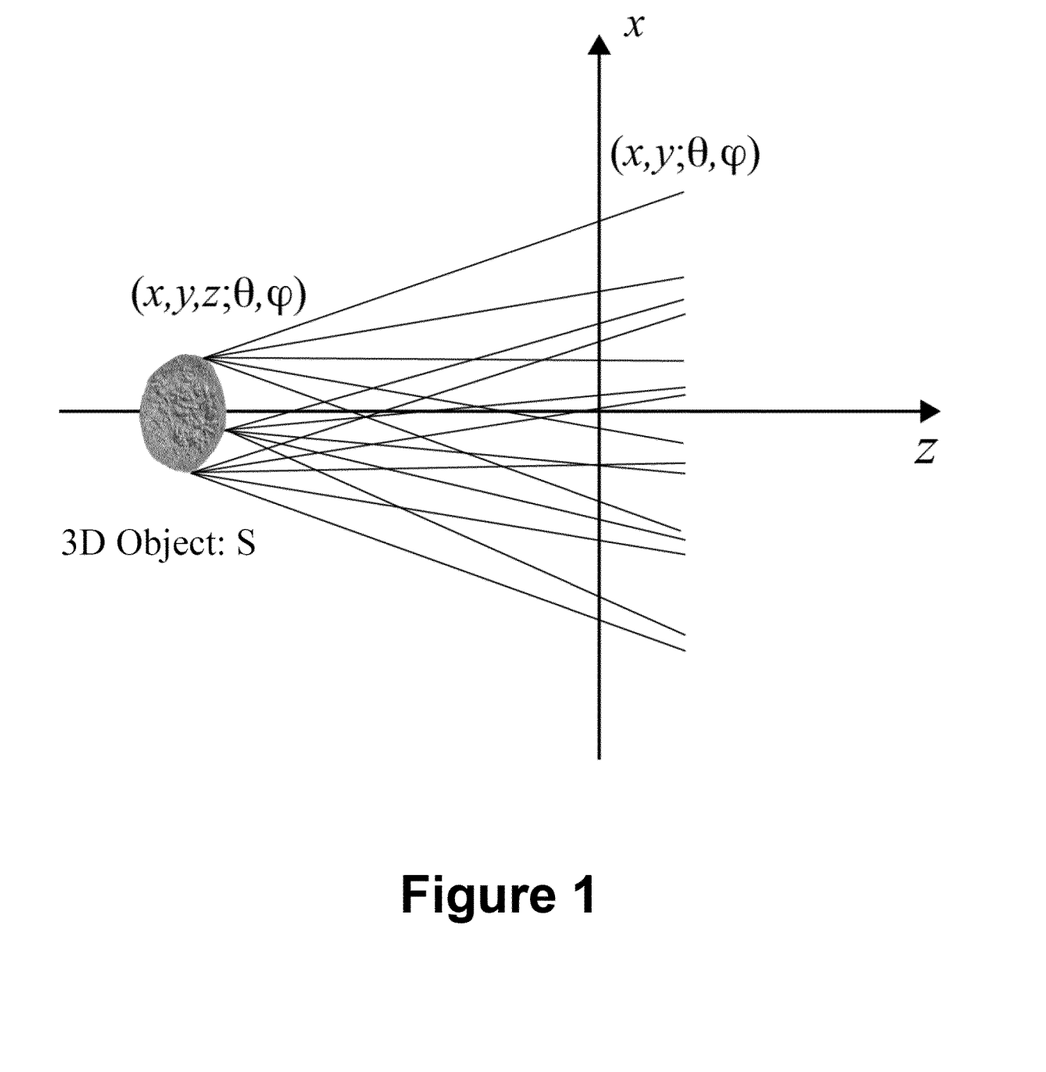
FIG. 1 shows a ray map emitted by a 3D scene. In a plane perpendicular to the direction of propagation of the light beam, each light ray is characterized by two spatial coordinates (x, y) and two angular coordinates ($\theta$, $\varphi$).

As shown in FIG. 1, a 3D scene emits a field of light rays that carries information on the spatial coordinates (x, y, z) of the light-emitting points, and also angular information ($\theta$, $\varphi$) associated to the inclination of each ray. If one considers light fields that basically propagate in the z direction, to characterize said field of light rays, the spatial coordinates (x, y) in any plane perpendicular to said z direction are enough. The four-dimensional function, L (x, y; $\theta$, $\varphi$), which describes the radiance of the field of light rays in a plane perpendicular to the direction of propagation of the field, is called the plenoptic function or also lightfield function [1].

Figure 2:
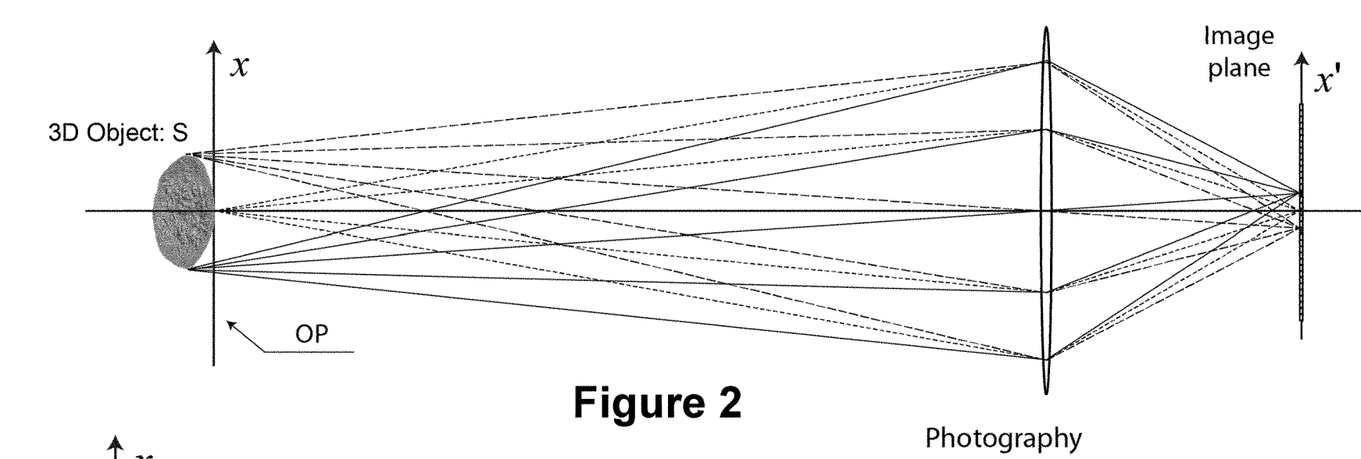
FIG. 2 shows a scheme of a conventional photography camera. Each pixel integrates all the light rays contained in a cone. These light rays are characterized by having the same spatial information, but different angular information.

Conventional photographic cameras basically consist of a photographic objective and an irradiance sensor. The photographic objective can have very complex designs. However, basically a photographic objective is composed of a lens (or a set of lenses aligned with the same optical axis) that provides the image of the object on the irradiance sensor, and of a diaphragm that limits the aperture of the system. The irradiance sensor is composed of a photosensitive pixel array. Each pixel integrates the radiance of all the rays reaching the same, coming from a point of the object. The set of pixels constitutes a two-dimensional photograph of the scene. Said 2D photograph contains spatial information of the scene, but has lost all the angular information contained in the rays emitted by the scene, as shown FIG. 2.

In mathematical terms, a photograph can be represented as the integral over the angular coordinates of the plenoptic function:

$$I(x, y) = \int_\theta \int_\varphi L(x, y; \theta, \varphi) \, d\theta \, d\varphi \quad (1)$$

This loss of angular information prevents conventional photography from observing the 3D scene from different perspectives. This makes much information about the scene hidden, due to relative occlusions in the scene, makes it difficult to calculate refocused images, and prevents accurate depth maps of 3D scenes from being obtained.

Figure 3:
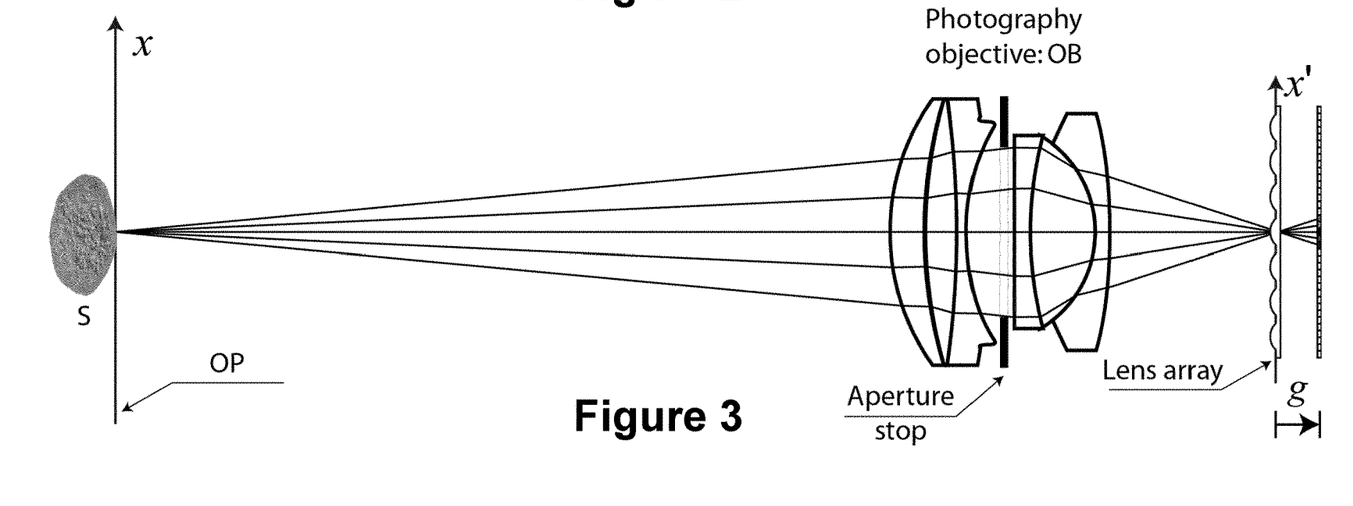
FIG. 3 shows a scheme of a conventional plenoptic camera. Each microlens captures a micro-image. All the pixels in a micro-image carry the same spatial information, but different angular information.

To solve these problems, the plenoptic camera, or lightfield camera, was proposed [2,3]. The design of this camera is based on inserting a microlenses array on the image plane of the conventional photography camera and moving the sensor to the conjugate plane, through the microlenses, with the aperture diaphragm, as shown in FIG. 3.

The plenoptic camera allows capturing the angular information of the light rays emitted by the sample. From the information contained in a plenoptic image it is possible to: (a) calculate a set of images with different perspectives; (b) compute a stack of refocused images at different depths; and (c) computing a depth map of the 3D scene.

However, this design of the plenoptic camera has some essential disadvantages: (a) It does not directly capture perspective images, but the perspectives are obtained after a computational pixel-mapping process; (b) Perspective images have a very poor spatial resolution (about 100 times worse than a conventional photograph); (c) The refocused images after a computational process also have very poor spatial resolution; also (d) The refocused images have a heterogeneous spatial resolution (each refocusing plane has its own spatial resolution); (e) The number of refocusing planes of the 3D scene is very low; and (f) The spatial resolution of the depth map is also very poor.

To sum up the state of the art of devices and systems proposed in the past to capture 3D images of macroscopic 3D scenes, some approaches are identified and briefly described below:

Stereoscopic camera [4]: Two photographs of the same scene are captured with two cameras whose optical axes are parallel. From the stereo pair, depth maps can be calculated, but with low resolution. Another defect of the stereoscopic camera is its inability to see partially occluded parts of the object, in order to provide acceptable results in cloudy media.

The above described plenoptic camera [5]: It is based on placing a microlens array in the image plane of a conventional photographic camera. A set of orthographic perspective images can be calculated from the plenoptic image, and from them a stack of refocused images. It is also possible to calculate a depth map. Its advantage over the stereoscopic camera is that it is a monocular camera and that it can resolve occlusions. Its main problem is the low resolution of the perspective images, and therefore of the refocused images and the depth map. Furthermore, the resolution is heterogeneous and not axially dense.

A more evolved plenoptic camera [6]: Similar to the previous one, but in this case the array of microlenses is located in an intermediate plane, and directly provides a matrix of images with a conical perspective, but with very little field of view each. Its advantages and disadvantages are similar to those of the above described plenoptic camera.

Camera with programmable aperture [7]: It is based on introducing a smaller mobile sub-aperture on the aperture diaphragm of the camera. For different positions of the sub-aperture a photograph is taken, which contains its own perspective of the 3D image. Its main advantage is that it allows to capture perspective images of high resolution. Its disadvantage is the impossibility of capturing the perspective images simultaneously, which lengthens the capture time. It prevents working with non-static scenes, and also the capture of 3D videos.

Projection of structured patterns [8]: It is a system based on the projection on the 3D scene of a pattern of infrared points. Using triangulation techniques on the image captured with an infrared camera, a depth map is calculated. Finally, this map is merged with an RGB image captured with a second camera of the system. The advantage of the system is that it provides 3D maps (RGB) in real time with a resolution comparable to that of the plenoptic camera. Its disadvantage lies in being an active method, since it requires the projection of an infrared pattern, and that it can only operate in a short range of distances.

Time of Flight (ToF) camera [9]: ToF cameras are based on the measurement of the phase change between infrared flashes emitted at high frequency by a modulated source and the signal received by an infrared camera after reflection on the surface of the 3D scene. The 3D map is fused with the RGB image captured by a second camera of the device. Although it surpasses the previous one in resolution and speed, it has the same disadvantages of being an active method, since it requires the projection of an infrared pattern, and that it can only operate in a short range of distances. On the other hand, neither this camera nor the previous one have the capacity to resolve occlusions.

It is, therefore, necessary to provide an alternative to the state of the art which covers the gaps found therein, by providing a multiperspective photography camera device which does not suffer from the problems of the photographic camera devices known in the art, and which is thus made to provide directly and simultaneously a set of high resolution images with different perspectives of a 3D scene, along a high field of view.

There are also devices known in the art which are not multiperspective photography camera devices to capture 3D images of macroscopic 3D scenes, but microscope or endoscope devices.

One of those devices is disclosed in CN111487759A, and is a multi-aperture imaging endoscopic system composed by a bitelecentric arrangement, a microlens array placed just behind the bitelecentric arrangement and a sensor at the focal plane of the microlenses. It is designed for collecting the parallel rays emerging from an endoscope. The main aim of that system is to avoid the crosstalk between perspective images provided by an endoscope. Since the microlenses are not at the plane conjugated with the aperture stop, the system provides images that are not free from the vignetting. This system cannot be used as multiperspective photography camera because it has no photography objective, and therefore cannot provide image of real objects, since those objects do not provide parallel rays, but diverging rays. Besides, in that case, the crosstalk is not avoided. This system cannot be attached to a photography objective, because photography objectives do no provide parallel rays, but strongly converging rays.

Other of those devices, particularly microscope devices, are disclosed in WO/2020/030841A1, X. Jiang et al., "Hardware implement of high resolution light field microscopy," Proc. SPIE 10458R-1 (2017), and M. Martinez-Corral et al., "Integral imaging with Fourier-plane recording," Proc. SPIE 102190B (2017). These documents are briefly disclosed below.

WO/2020/030841A1 discloses a plenoptic ocular device composed by an external aperture stop, a non-telecentric doublet, which behaves as a conventional eyepiece, a microlens array and a CCD-type sensor. This device is designed for collecting the rays which, emitted by close microscopic objects and refracted through the microscope objective, emerge from the microscope tube lens. Thus, the plenoptic ocular captures the light emitted by the intermediate image provided by the tube lens, which is just at the external aperture stop. This device cannot be used for conventional photography, since it cannot provide multiperspective images of macroscopic objects that are far from the device.

X. Jiang et al. discloses a light field microscope including an imaging plenoptic camera that is based on placing a microlens array in the image plane of a conventional microscope. A set of orthographic perspective images can be calculated from the plenoptic image, and from them a stack of refocused images. It is also possible to calculate a depth map. Its advantage over the stereoscopic camera is that it is a monocular camera and that it can resolve occlusions. Its main problem is the low resolution of the perspective images, and therefore of the refocused images and the depth map. Furthermore, the resolution is heterogeneous and not axially dense.

M. Martinez-Corral et al. discloses an integral microscope that is composed exclusively of a microscope objective, telecentric arrangement, a microlenses array, located at the Fourier plane, and a CCD-type sensor. It provides multiperspective images from microscopic samples placed at the front focal plane of the microscope objective. This device cannot be used as a multiperspective photography camera because it is prepared to collect only the strongly diverging rays emitted by microscopic object placed very close to the device.

SUMMARY OF THE INVENTION

To that end, the present invention relates to a multiperspective photography camera device, for capturing perspective images of a macroscopic 3D scene, comprising:
  a hollow casing having a front opening for the entry of light coming from a macroscopic three-dimensional (3D) scene to be photographed and placed at an object plane OP; and housed within and attached to said hollow casing:
  a lens array configured and arranged to be placed between a photographic objective, having an aperture diaphragm, and a photosensitive pixel array sensor, to receive light coming from said macroscopic 3D scene and passing through the photographic objective and to transmit said received light to said photosensitive pixel array sensor.

In contrast to the multiperspective photography camera devices of the state of the art, particularly in contrast to the prior art plenoptic camera devices, the multiperspective photography camera device proposed by the present invention further comprises, housed within and attached to the hollow casing:
  a field diaphragm configured and arranged to be placed at a plane where an image provided by said photographic objective is to be formed; and
  at least one converging lens having a focal length $f_R$, and that is placed between said field diaphragm and said lens array, at a distance equal to $f_R$ from the field diaphragm.

In addition, in the multiperspective photography camera device proposed by the present invention the lens array is configured and arranged to be placed at a conjugate plane of the aperture diaphragm of the photographic objective, so that the lens array is arranged to simultaneously receive and simultaneously transmit to the photosensitive pixel array sensor light representative of a plurality of different perspectives of the macroscopic 3D scene, one perspective per array lens.

Therefore, a set of images with different perspectives of the macroscopic 3D scene can be directly acquired by the photosensitive pixel array sensor with a single camera shot.

For an embodiment of the multiperspective photography camera device of the present invention, the lens array is placed at a distance d from the at least one converging lens, wherein $d = f_R + z_R'$, wherein $$z_R' = \frac{f_R^2}{z_A' + z_{ob}'},$$

wherein $z_A'$ is the distance from the conjugate plane of the aperture diaphragm of the photographic objective to the image focus $F'_{ob}$ of the photographic objective, wherein $$z_{ob}' = \frac{f_{ob}^2}{z_{ob}}$$

is the distance from the field diaphragm to the image focus $F'_{ob}$ of the photographic objective, wherein $f_{ob}$ is the focal length of the photographic objective, and wherein $z_{ob}$ is the distance from the object plane to the object focus $F_{ob}$ of the photographic objective.

According to an embodiment, the multiperspective photography camera device of the present invention further comprises the above mentioned photographic objective housed within and attached to the hollow housing, and arranged behind the front opening so that light coming from the 3D scene passes first through the front opening, then through the photographic objective, then through the at least one converging lens and then through the lens array to impinge on the photosensitive pixel array sensor.

For an implementation of the embodiment described in the immediately preceding paragraph, the multiperspective photography camera device of the present invention further comprises the above mentioned photosensitive pixel array sensor housed within and attached to the hollow housing, and arranged behind said lens array at a distance coincident with the focal distance $f_{ML}$ of the lenses of the lens array, wherein the photosensitive pixel array sensor comprises several groups of photosensitive elements, each group comprising a plurality of photosensitive elements facing a respective lens of the lens array to sense light of a respective perspective image of the 3D scene. Hence, for the here described implementation, the multiperspective photography camera device constitutes a whole multiperspective photography camera, which preferably comprises other conventional optic devices included in photography cameras (such as a camera shutter), which have not been described in the present document not to obscure the description of the innovative components of the present invention.

Preferably, each of said pluralities of photosensitive elements comprises at least 10,000 photosensitive elements, distributed for example in the form of a 100×100 two-dimensional square or hexagonal array. Specifically, for an embodiment where each lens of the lens array has an area of 1 mm² and each photosensitive element, i.e. each pixel, of the photosensitive pixel array sensor has an area of 0.000010 mm², then each plurality of photosensitive elements comprises about 100,000 photosensitive elements (pixels), exactly 102,400 if the plurality of photosensitive elements is in the form of a 320×320 two-dimensional square array.

According to an embodiment of the multiperspective photography camera device of the present invention, the hollow casing further comprises a back opening for the exit of light coming from the lens array, and a back coupling arrangement for coupling the hollow casing to a camera body housing the photosensitive pixel array sensor, such that the back opening is optically communicated and aligned with an opening of said camera body and the lens array is distanced from the photosensitive pixel array sensor a distance coincident with the focal distance $f_{ML}$ of the lenses of the lens array.

For an implementation of the embodiment described in the immediately preceding paragraph, the multiperspective photography camera device of the present invention further comprises the above mentioned photographic objective housed within and attached to the hollow housing, and arranged behind the front opening so that light coming from the 3D scene passes first through the front opening, then through the photographic objective, then through the at least one converging lens and then through the lens array to impinge on the photosensitive pixel array sensor. For this implementation, the multiperspective photography camera device does not constitute a whole multiperspective photography camera, as it lacks the photosensitive pixel array sensor, but a module to be coupled to the above mentioned camera body that houses the photosensitive pixel array sensor, so that a photographic camera is built.

For an alternative implementation of that embodiment, the multiperspective photography camera device of the present invention further comprises a front coupling arrangement for coupling the hollow casing to said photographic objective, such that the front opening of the hollow casing is optically communicated and aligned with the photographic objective and the requested value of $z'_{ob}$ is achieved. For this implementation, the multiperspective photography camera device does not either constitute a whole multiperspective photography camera, as it lacks the photographic objective and the photosensitive pixel array sensor, but a module to be intercoupled between an external photographic objective and the above mentioned camera body that houses the photosensitive pixel array sensor, so that a multiperspective photography camera is built.

For an embodiment, the multiperspective photography camera device of the present invention further comprises a front separation distance adjustment mechanism to adjust the separation distance between the photographic objective and the field diaphragm so that the requested value of $z'_{ob}$ is achieved. For an alternative and less preferred embodiment, such a front separation distance adjustment mechanism is not included, as that separation distance is factory set.

According to an embodiment, the multiperspective photography camera device of the present invention further comprises a back separation distance adjustment mechanism to adjust the separation distance between the at least one converging lens and the lens array so that the requested value of $z'_R$ is achieved. For an alternative and less preferred embodiment, such a back separation distance adjustment mechanism is not included, as that separation distance is factory set.

For an embodiment, the lenses of the lens array are equidistantly separated a distance p between the centres of each two contiguous lenses.

According to an embodiment, the lens array of the multiperspective photography camera device of the present invention is a J×J two-dimensional lens array, where preferably J≤5.

For an embodiment, the photosensitive pixel array sensor is formed by a two-dimensional pixel array of J×J groups of N×N photosensitive elements, where $N=p/\delta_p$, where $\delta_p$ is the size of each photosensitive element, or pixel.

The multiperspective photography camera device of the present invention further comprises, for an embodiment, processing means operatively connected to the photosensitive pixel array sensor to receive output signals and process output signals coming therefrom and being representative of the plurality of different perspectives of the 3D scene.

For an alternative or complementary embodiment, the multiperspective photography camera device of the present invention further comprises communication means operatively connected to the photosensitive pixel array sensor to receive therefrom output signals being representative of the plurality of different perspectives of the 3D scene, and being configured to transmit the received output signals to remote processing means configured to process said output signals.

For several embodiments of the multiperspective photography camera device of the present invention, the above mentioned processing means and/or remote processing means are configured to perform at least one of the following tasks, for static and dynamic scenes, by processing the received output signals: 3D image reconstruction of non-occluded and occluded objects, generation of depth maps, and ballistic photon signal strengthening.

For a preferred embodiment, the multiperspective photography camera device of the present invention constitutes a passive device configured to operate under ambient light.

The multiperspective photography camera device proposed by the present invention can be also used to capture 3D videos of the 3D scene, or a sequence of consecutive 3D photographs.

The present invention allows the simultaneous capture of an array of elemental/perspective images (that is, of photographs from different perspectives) with high resolution of macroscopic 3D scenes.

This set of elemental/perspective images allows, for both static and dynamic scenes, the calculation of stacks of high-resolution refocused images at different depths. In other words, it enables high-resolution refocusing a posteriori. This ability to refocus has the additional advantage that it can be carried out even in partially occluded scenes, since to reconstruct an occluded part it is enough that it is visible to at least one of the elemental/perspective images.

From the elemental/perspective images, high-resolution depth maps of distant scenes can also be obtained in real time. This capability can have important applications in metrology.

Another advantage comes from the ability of multiperspective systems to reinforce the signal of ballistic photons, compared to those that suffer from scattering. This enables the invention to obtain refocused images and depth maps in cloudy environments, such as the case where the 3D scene is located in a smoky or foggy environment.

An additional application from the depth map is the computation of images for its display on auto-stereoscopic 3D monitors.

Therefore, the use of the device of the present invention allows to capture the 3D structure of near and distant scenes, operating with ambient light and even in unfavorable conditions, such as an environment with fog, smoke, or other diffusive elements. This allows passive 3D metrology and variable environments.

To sum up, some of the main advantages of the present invention over existing plenoptic camera devices, for all or some of its embodiments:

Allows to directly capture, in a single shot, a set of elemental/perspective images of macroscopic 3D scenes.

Elemental/perspective images have high resolution, since their resolution is not determined by the lens array but by the pixel density of the photosensitive pixel array sensor.

Perspective images have a large depth of field since their hyperfocal distance is short.

From the elemental/perspective images it is possible to calculate a stack of images refocused at different depths. Contrary to what happens with existing plenoptic cameras, all refocused images have the same angular resolution.

All elemental/perspective images are associated with the same impulse response (Point Spread Function—PSF). This allows the simple and real-time application of computational deconvolution tools.

Allows the calculation, with the usual computational tools, of high resolution depth maps. This enables high resolution passive metrology to be carried out remotely.

Allows to perform all the above tasks with dynamic images if the sensor allows it.

Some potential applications of the device of the present invention are listed below:

Surveillance: The device allows the detection and tracking of moving elements in open or closed areas, even in conditions of an environment with fog or smoke.

Macroscopic metrology: The device allows determining the position (x, y, z) of fixed or mobile elements in distant scenes.

Security: The device allows to measure the structure (x, y, z) in scenes with little visibility, as is the case of scenes with smoke.

Topography: The device allows the generation of depth maps to calculate distances and/or generate topographic maps.

3D scanner: The device allows 3D scans of, for example, people, furniture, etc.

From the 3D depth map of nearby scenes, 3D images can be generated for projection on autostereoscopic monitors.

BRIEF DESCRIPTION OF THE FIGURES

In the following some preferred embodiments of the invention will be described with reference to some of the enclosed figures, particularly FIGS. 4 to 8. They are provided only for illustration purposes without however limiting the scope of the invention. In addition, some of the enclosed figures, particularly FIGS. 1 to 3, have been referred in the above background section to describe the state of the art.

FIG. 4 is a scheme of the multiperspective photography camera device of the present invention, for an embodiment corresponding to the implementation described in the previous section for which the multiperspective photography camera device constitutes a whole multiperspective photography camera. Each lens or the lens array provides a different perspective of the 3D scene. $\theta_{max}$ is the angle of maximum parallax and $\theta'_{max}$ its conjugate. In this figure, the capital F is used to represent the foci (or focal planes) of the lenses. In this sense $F_{ob}$ and $F'_{ob}$ are, respectively, the object focus and the image focus of the lens. Similarly, $F_R$ and $F'_R$ are the foci of $L_R$. For focal lengths the lowercase f has been used. Also, the z distances always take their origin at the foci of the lenses. In this figure only have been drawn the light rays that pass through the optical centre of the lenses of the lens array.

DESCRIPTION OF THE PREFERRED EMBODIMENTS

In the present section some working embodiments of the present invention will be described with reference to FIGS. 4 to 9, referred below as first, second and third working embodiments, all of which show a multiperspective photography camera device comprising:

a hollow casing 10a-10b, 11, 13 having a front opening for the entry of light coming from a 3D scene S to be photographed and placed at an object plane OP; and housed within and attached to the hollow casing 10a-10b, 11, 13:

a lens array 8 configured and arranged to be placed between a photographic objective OB, having an aperture diaphragm 2, and a photosensitive pixel array sensor 9, to receive light coming from the 3D scene S and passing through the photographic objective OB and to transmit said received light to said photosensitive pixel array sensor 9;

a field diaphragm 5, housed within and attached to the hollow casing 10a-10b, 11, 13, and configured and arranged to be placed at a plane where an image provided by the photographic objective OB is to be formed; and at least one converging lens 6 having a focal length $f_R$, and that is placed between the field diaphragm 5 and the lens array 8, at a distance equal to $f_R$ from the field diaphragm 5.

For all those embodiments, the lens array 8 is configured and arranged to be placed at a conjugate plane of said aperture diaphragm 2 of the photographic objective OB, so that the lens array 8 is arranged to simultaneously receive and simultaneously transmit to the photosensitive pixel array sensor 9 light representative of a plurality of different perspectives of the 3D scene S, one perspective per array lens.

Figure 4:
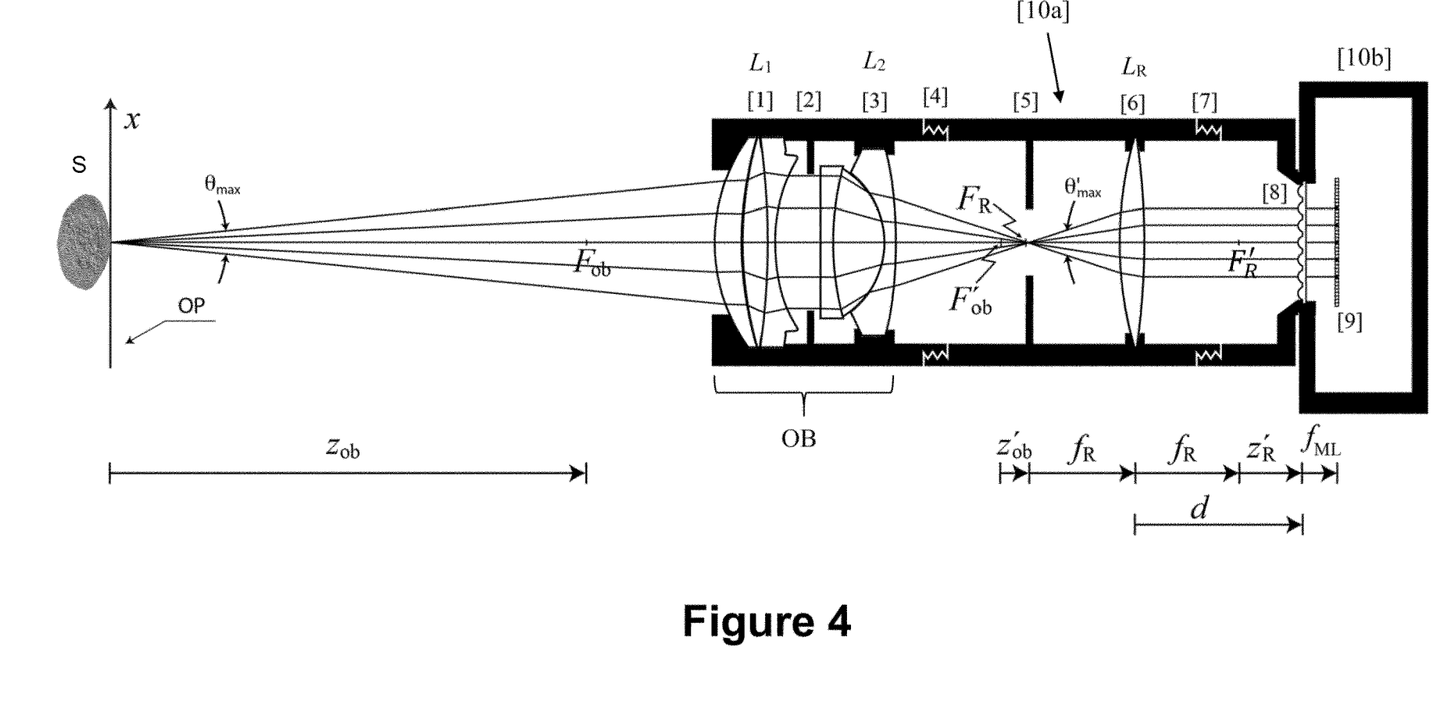

Specifically, for the first working embodiment illustrated by FIG. 4, the multiperspective photography camera device is a whole photography camera. Two essential conjugation relationships can be seen in the scheme shown in that figure, namely: (a) The object plane OP is conjugated with the field diaphragm 5, and this with the photosensitive pixel array sensor 9; (b) The aperture diaphragm 2 of the photographic objective OB is conjugated with the lens array 8. If one looks at the path of the central light rays, one can see that each lens of the lens array 8 provides a different image of the 3D object S to the photosensitive pixel array sensor 9. Each lens "sees" the object S from a different perspective. For this reason, these images are called perspective images, or also elemental images. The angle $\theta_{max}$ formed by the central light rays corresponding to the outermost lenses of the lens array 8 defines the maximum difference in perspective angle, and is called the angle of maximum parallax. In short, the multiperspective camera provides directly, and with a single shot, a set of images with different perspective of the 3D scene.

As seen in FIG. 4, the multiperspective photography camera there illustrated comprises a hollow casing which, for the illustrated embodiment, is formed by a front hollow casing portion 10a and a back hollow casing portion 10b, coupled to each other, but for non-illustrated embodiments is formed by a single-piece hollow casing.

The photography camera of FIG. 4 comprises the following components housed within and attached to the front hollow casing portion 10a:

OB: Photographic objective of focal length $f_{ob}$ (the focal length of a lens or lens coupling arrangement is often called the effective focal length (EFL)), and that, for the illustrated embodiment, is composed of:
  1: Converging lens (or lens coupling arrangement) $L_1$ of focal length $f_1$
  2: Aperture diaphragm of diameter $\phi_A$;
  3: Converging lens (or lens coupling arrangement) $L_2$ of focal length $f_2$.

A perspective multiplexer module composed of:
  5: Field diaphragm of diameter $\phi_F$ that is located on the plane in which the image provided by the photographic objective OB is formed. Therefore, the distance from the photographic objective OB to the field diaphragm 5 is modifiable depending on the distance to the focused object S. In case where the camera focuses on an object at infinity, the field diaphragm 5 is placed at the image focus of the photographic objective OB. When focusing on closer objects, the field diaphragm 5 is positioned at a distance $$z'_{ob} = \frac{f_{ob}^2}{z_{ob}} \qquad (2)$$

from the image focus $F'_{ob}$ of the photographic objective OB. In this equation $z_{ob}$ is the distance from the object plane OP to the object focus $F_{ob}$ of the photographic objective OB.

The mission of the field diaphragm 5 is to avoid overlapping between elemental images. Therefore, its diameter must satisfy the following equation:

$$\phi_F = p \frac{f_R}{f_{ML}} \qquad (3)$$

4: Front separation distance adjustment mechanism, formed for example by a thread or telescopic system, to adjust the separation distance between the converging lens 3 of photographic objective OB and the field diaphragm 5 so that the requested value of $z'_{ob}$ is achieved.

6: Converging lens $L_R$ (or lens coupling arrangement) of focal length $f_R$, which is located at a distance $f_R$ from the field diaphragm 5.

Figure 5:
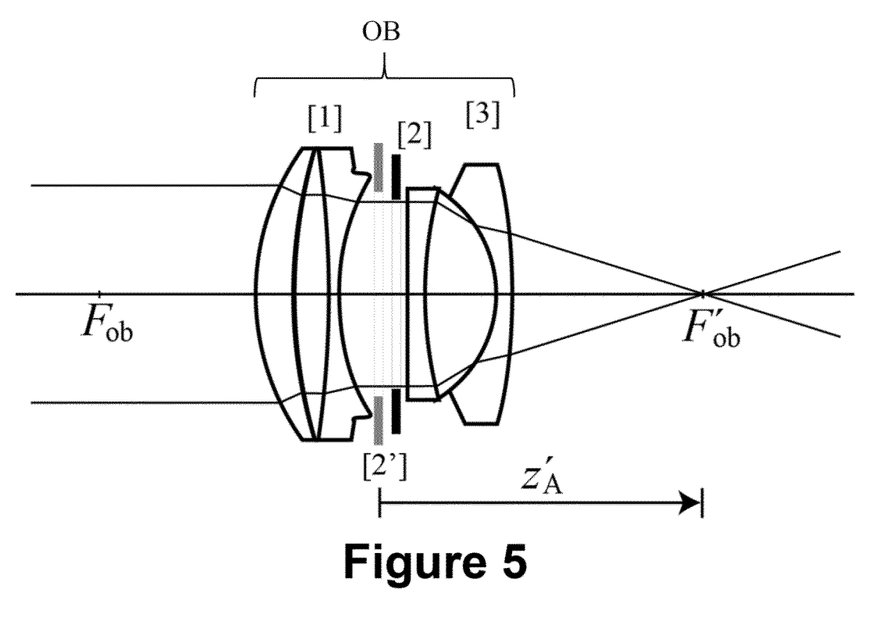
FIG. 5 is a scheme showing the relative position between the image focus of a photographic objective and its exit pupil 2'. The exit pupil is the conjugate of the aperture diaphragm through $L_2$.

8: Lens array with focal length $f_{ML}$ and equidistance p between lenses. The lens array 8 is located in a plane conjugated to the aperture diaphragm 2 of the photographic objective OB. This conjugation occurs under the joint action of the second converging lens $L_2$ of the photographic objective OB and the converging lens $L_R$. Expressing this property in mathematical terms, the lens array 8 is located at a distance $d=f_R+z'_R$ from the lens $L_R$, where $$z'_R = \frac{f_R^2}{z'_A + z'_{ob}},$$

where $z'_A$ is the distance from the conjugate 2' of the aperture diaphragm 2 through $L_2$, to $F'_{ob}$, as shown in FIG. 5.

7: Back separation distance adjustment mechanism, formed for example by a thread or telescopic system, that allows modifying the separation distance between the converging lens 6 and the lens array 8 so that the requested value of $z'_{ob}$ is achieved.

For the embodiment of FIG. 4, the multiperspective photography camera further comprises the following components, but not housed within front hollow casing 10a:

Multiperspective camera body, composed of:

10b: The above mentioned back hollow casing to which the front hollow casing 10a is coupled (mechanically and optically), and within which the following component is housed and attached to:

9: A pixelated photosensitive recording medium (such as a CCD or CMOS sensor), or photosensitive pixel array sensor, with pixel size $\delta_p$ located at a distance $f_{ML}$ from the lenses of the lens array 8. This medium records the elemental images, and comprises communication means configured to transmit the set of elemental images (or output signals representative thereof) to external remote image processing means and/or are operatively connected to local processing means to process those elemental images (or output signals representative thereof).

The number of elemental images J×J depends on the value of p. The higher the value of J, the greater the number of perspectives captured and therefore the higher the angular resolution. However, and since all the elemental images are captured simultaneously by the same sensor 9, a high value of J results in elemental images made up of few pixels. To obtain a good compromise between spatial and angular resolution, it is recommended to implement the device so that J≤5.

The number of pixels in each elemental image is N×N, where $N=p/\delta_p$.

The f-number associated with each elemental image, $f_\#^{EI}$, is obtained by multiplying the f-number of the photographic objective, $f_\#$, by J. Mathematically: $f_\# = f_{ob}/\phi_A$; $f_\#^{EI} = J \cdot f_\#$.

It is well known that a photographic camera focused at the hyperfocal distance, $a_H$, provides sharp images for objects located between $a_H/2$ to infinity. For each of the elemental images the hyperfocal distance is equal to $$a_H = \frac{f_{ob}^2}{J \cdot f_\# \cdot 2\delta_p} \qquad (4)$$

Another important property is the parallax with which the objects photographed with the device of the present invention are observed. This parameter is quantified by the maximum parallax angle $\theta_{max}$ (see FIG. 4). $\theta_{max}$ is the angle subtended by the aperture diaphragm 2 from the centre of the object S. Mathematically, $\theta_{max}$ is calculated with the following expressions:

$$\theta'_{max} = \frac{1}{f_\#} \frac{f_{ob}}{z'_A + f_{ob}^2/z_{ob}} \qquad (5a)$$

$$\theta_{max} = \theta'_{max} \frac{f_{ob}}{z_{ob}} = \frac{1}{f_\#} \frac{f_{ob}^2}{f_{ob}^2 + z_{ob} z'_A} \qquad (5b)$$

A last parameter of interest is the field of view (FOV) photographed by each elemental image, which can be calculated as:

$$FOV = \frac{p}{M_T} \qquad (6a)$$

where $$M_T = \frac{f_{ob} f_{ML}}{z_{ob} f_R} \qquad (6b)$$

is the total magnification of the multiperspective photography camera. As this photography camera generally works with distant objects, it is better to express the field of view in angular coordinates, thus, the angular field of view (AFOV) is calculated as:

$$AFOV = p \frac{f_R}{f_{ob} f_{ML}} \qquad (6c)$$

Considering, for example, the following practical case: (a) Photographic objective OB: $f_{ob}=35$ mm, $f_\#=2.8$; (b) Lens $L_R$: $f_R=25$ mm. (c) Lenses of the lens array 8: p=1.30 mm, $f_{ML}=7.80$ mm; (d) Photosensitive pixel array sensor 9:

$\delta_p$=2.2 µm, the following results are obtained for the particular case of an object located 2.0 meters from the photographic objective OB:
  i) Position of the field diaphragm 5: $z_{ob}'$=0.6 mm.
  ii) Position of the lens array 8: d=39.7 mm.
  iii) Number of elemental images: J=5.64.
  iv) Diameter of the field diaphragm 5: $\phi_F$=4.17 mm.
  v) Number of pixels per elemental image: 590×590.
  vi) Angle of maximum parallax: 0.3°.
  vii) Field of view: 240 mm.
  viii) Total magnification of the photography camera: $M_T$=0.005.
  vii) Hyperfocal distance: 17.0 m.

The proposed multiperspective photography camera device works with distant objects (generally located several metres away), captures large fields (depending on the distances they can be up to metres), captures very small parallaxes (generally a few tenths degree) and provides elemental images with a very small scale (in the above particular case 200 times smaller than the object).

Figure 6:
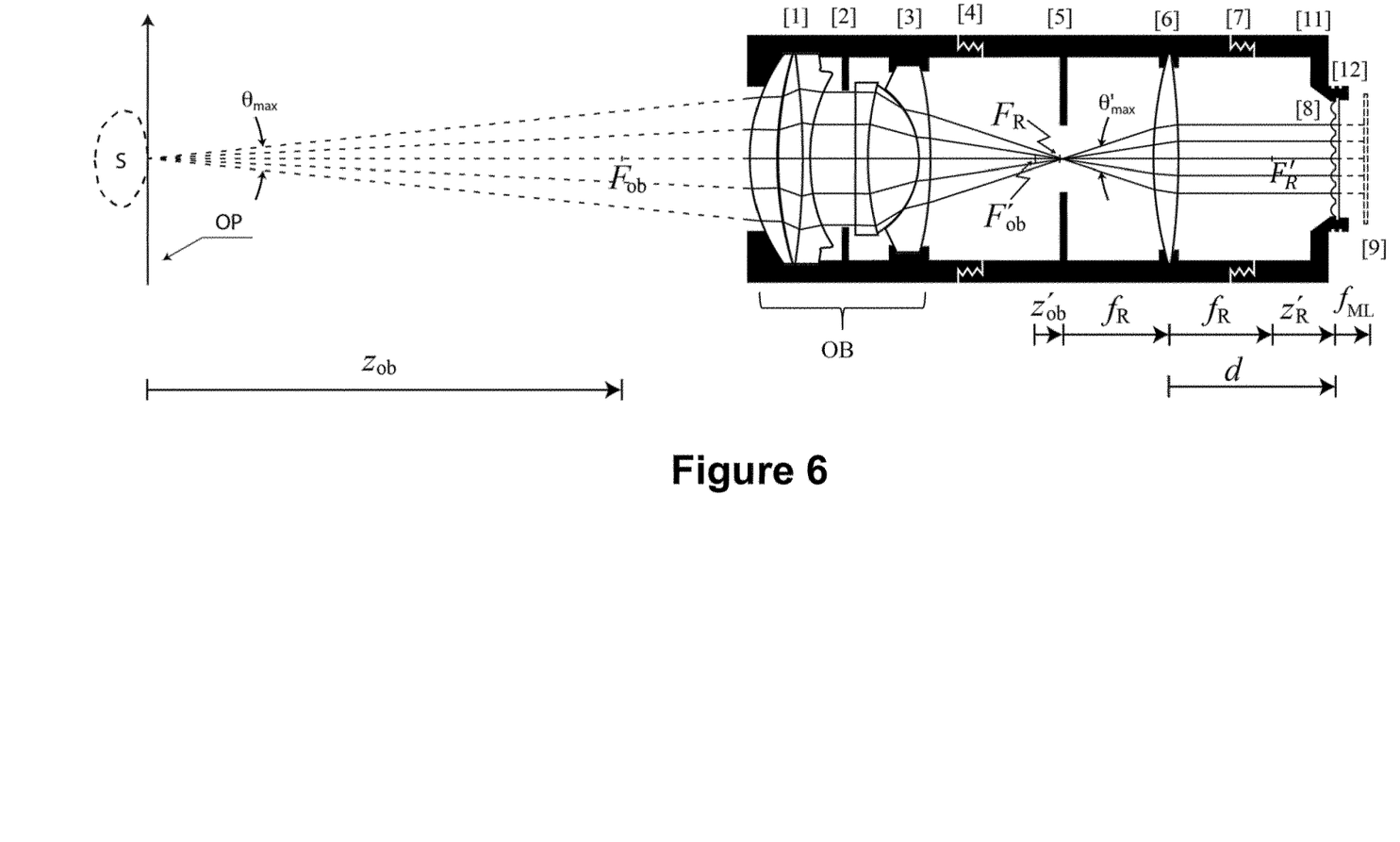
FIG. 6 is a scheme of the multiperspective photography camera device of the present invention, for an embodiment corresponding to the implementation described in the previous section for which the multiperspective photography camera device constitutes a module to be coupled to a camera body that houses the photosensitive pixel array sensor, so that a photographic camera is built. This module can be called multiperspective photographic objective, as it includes the photographic objective.

A second working embodiment of the multiperspective photography camera device of the present invention is shown in FIG. 6 shows a further embodiment, particularly that for which the device implements a module called herein multiperspective photographic objective, which can be attached to a photography camera body that houses the photosensitive pixel array sensor 9. The device of FIG. 6 includes the following components:

11: Casing in which the following components are housed and attached:
    1: Converging lens (or lens coupling arrangement) $L_1$ of focal length $f_1$.
    2: Aperture diaphragm of diameter $\phi_A$;
    3: Converging lens (or lens coupling arrangement) $L_2$ of focal length $f_2$.
    5: Field diaphragm of diameter $\phi_F$.
    6: Converging lens $L_R$ (or lens coupling arrangement) of focal length $f_R$, which is located at a distance $f_R$ from the field diaphragm 5.
    8: Lens array with focal length $f_{ML}$ and equidistance p between lenses, and located in a plane conjugated to the aperture diaphragm 2 of the photographic objective OB.
  4: Front separation distance adjustment mechanism, formed for example by a thread or telescopic system (in this case defined in a perimeter wall of casing 11), that allows modifying the separation distance between the converging lens 3 of photographic objective OB and the field diaphragm 5 so that the requested value of $z'_{ob}$ is achieved.
  7: Back separation distance adjustment mechanism, formed for example by a thread or telescopic system (in this case defined in a perimeter wall of casing 11), that allows modifying the separation distance between the converging lens 6 and the lens array 8 so that the requested value of $z'_{ob}$ is achieved.
  12: A back coupling arrangement, such as a male thread (in this case defined at a back end of casing 11, surrounding a back opening thereof), for coupling the multiperspective photographic objective to a camera body housing the photosensitive pixel array sensor 9.

Figure 7:
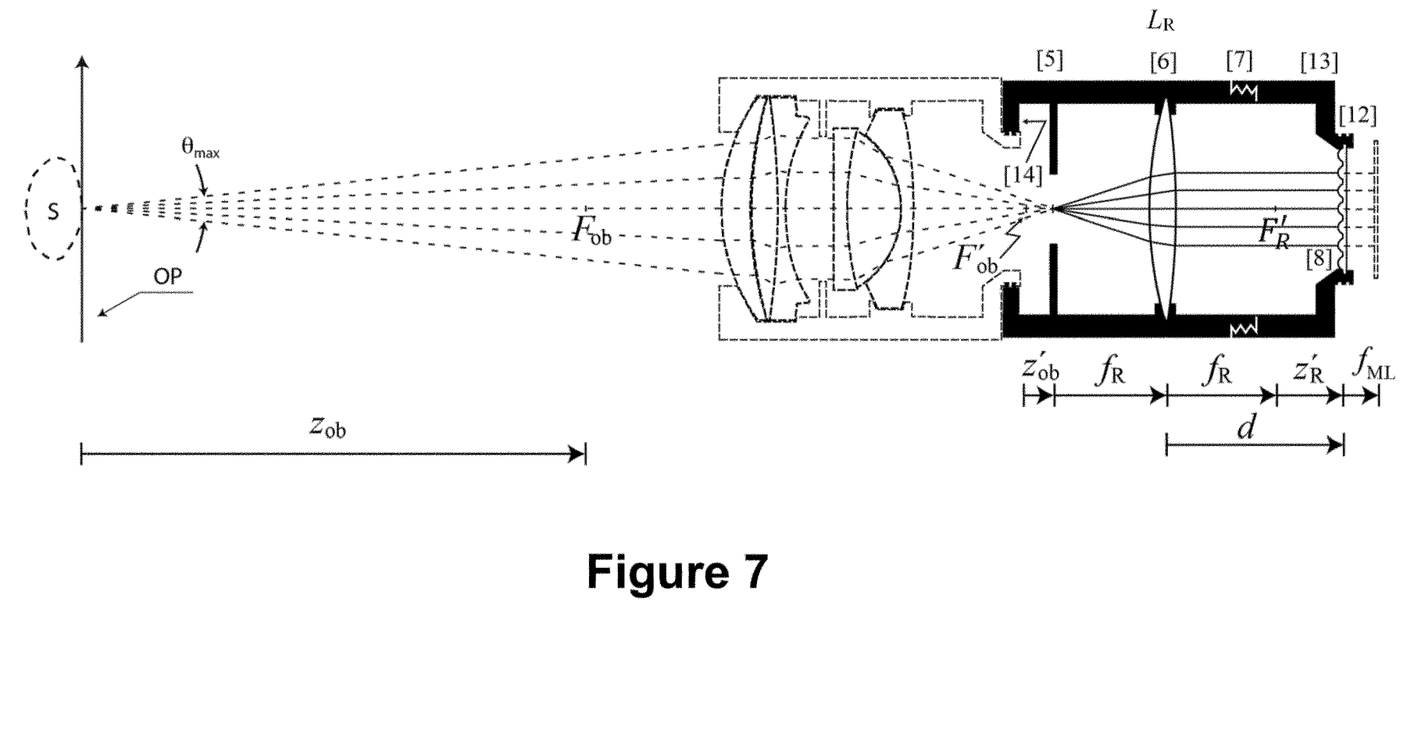
FIG. 7 is a scheme of the multiperspective photography camera device of the present invention, for an embodiment corresponding to the implementation described in the previous section for which the multiperspective photography camera device constitutes a module to be intercoupled between an external photographic objective and a camera body that houses the photosensitive pixel array sensor, so that a photography camera is built. This module can be called perspective multiplexer accessory.

A third working embodiment of the multiperspective photography camera device of the present invention is shown in FIG. 7 shows a further embodiment, particularly that for which the device implements a module called herein perspective multiplexer accessory, which is configured and arranged to be intercoupled between an external photographic objective OB and a camera body that houses the photosensitive pixel array sensor 9. The device of FIG. 7 includes the following components:

13: Casing in which the following components are housed and attached:
    5: Field diaphragm of diameter $\phi_F$.
    6: Converging lens $L_R$ (or lens coupling arrangement) of focal length $f_R$, which is located at a distance $f_R$ from the field diaphragm 5.
    8: Lens array with focal length $f_{ML}$ and equidistance p between lenses, and located in a plane conjugated to the aperture diaphragm 2 of the photographic objective OB.
  7: Back separation distance adjustment mechanism, formed for example by a thread or telescopic system (in this case defined in a perimeter wall of casing 13), that allows modifying the separation distance between the converging lens 6 and the lens array 8 so that the requested value of $z'_{ob}$ is achieved.
  12: A back coupling arrangement, such as a male thread (in this case defined at a back end of casing 13, surrounding a back opening thereof), for coupling the perspective multiplexer accessory to a camera body housing the photosensitive pixel array sensor 8.
  14: A front coupling arrangement, such as a female thread (in this case defined at a front end of casing 13, specifically in the contour of a front opening thereof), for coupling the perspective multiplexer accessory to a photographic objective OB.

All what has been explained above regarding the first working embodiment, with respect to the operation of the device and to the locations at which the different components of the device must be placed, is also valid for both the second and third working embodiments of the multiperspective photographic camera device of the present invention.

Figure 8:
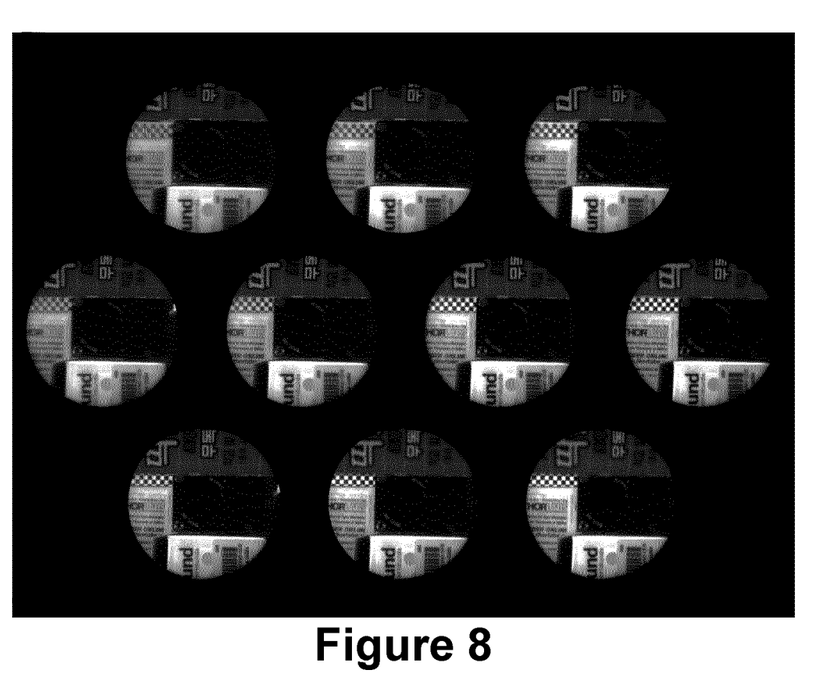
FIG. 8 shows an image captured with a prototype of the multiperspective photography camera device of the present invention.
Figure 9:
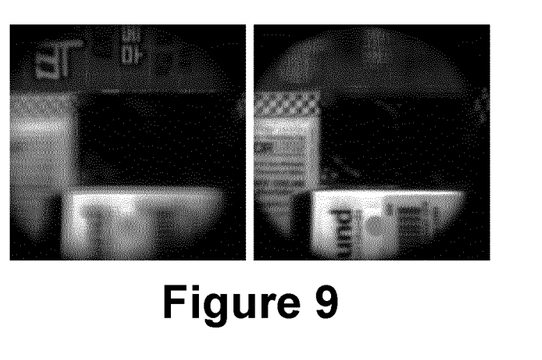
FIG. 9 shows the result of applying a refocusing algorithm to the images of FIG. 8. The refocusing algorithm allows the posterior focus of different parts of the scene. In this case, the letters in the background (left image) or the letters in the foreground (right image).

Finally, a prototype of the multiperspective photographic camera device of the present invention has been built by the present inventors, with which the image of FIG. 8 has been captured. The image consists of ten elemental images in a hexagonal arrangement. In FIG. 9 the result of applying a refocusing algorithm by the local and/or remote processing means is shown, particularly to focus a background part of the scene, (left image) and a foreground part of the scene (right view).

A person skilled in the art could introduce changes and modifications in the embodiments described without departing from the scope of the invention as it is defined in the attached claims.

REFERENCES

[1] E. H. Adelson and J. R. Bergen, "The plenoptic function and the elements of early vision," in Computational Models of Visual Processing, L. M. and J. Movshon, eds. (MIT Press, Camdridge. MA, 1991), pp. 3-20.

[2] E. H. Adelson and J. Y. A. Wang, "Single lens stereo with a plenoptic camera," IEEE Trans. Pattern Anal. Mach. Intell. pp. 99-106 (1992).

[3] R. Ng, M. Levoy, M. Brédif, G. Duval, M. Horowitz, and P. Hanrahan, "Light field photography with a hand-held plenoptic camera," Tech. rep., Standford University (2005).

[4] R. Gregory et al., "Conversion of at least one non-stereocamera into a stereo camera" US 2015/0103146 A1

[5] R. Ng et al., "Light field data acquisition", U.S. Pat. No. 8,724,014 B2.

[6] T. Georgiev, "Plenoptic camera", US 2010/0020187 A1.

[7] C. Liang et al., "Camera using programable aperture", US 2008/0124070 A1.
[8] Z. Zalevsky et al., "Three-dimensional sensing using speckle patterns" U.S. Pat. No. 8,390,821 B2
[9] R. Lange, P. Seitz, A. Biber and R. Schwarte, "Time-of-flight range imaging with a custom solid-state image sensor," *Laser Metrology Inspection*, vol. 3823, pp. 180-191, 1999.

The invention claimed is:

1. A multiperspective photography camera device, for capturing perspective images of a macroscopic 3D scene, comprising:
   a hollow casing having a front opening for the entry of light coming from a macroscopic 3D scene to be photographed and placed at an object plane; and housed within and attached to said hollow casing;
   a lens array configured and arranged to be placed between a photographic objective, having an aperture diaphragm, and a photosensitive pixel array sensor, to receive light coming from said macroscopic 3D scene and passing through the photographic objective and to transmit said received light to said photosensitive pixel array sensor;
   wherein the multiperspective photography camera device further comprises, housed within and attached to said hollow casing:
   a field diaphragm configured and arranged to be placed at a plane where an image provided by said photographic objective is to be formed; and
   at least one converging lens having a focal length $f_R$, and that is placed between said field diaphragm and said lens array, at a distance equal to said focal length $f_R$ from the field diaphragm;
   and wherein the lens array is configured and arranged to be placed at a conjugate plane of said aperture diaphragm of the photographic objective, so that the lens array is arranged to simultaneously receive and simultaneously transmit to the photosensitive pixel array sensor light representative of a plurality of different perspectives of the macroscopic 3D scene, one perspective per array lens.

2. The multiperspective photography camera device of claim 1, wherein the lens array is placed at a distance d from the at least one converging lens, wherein $d=f_R+z'_R$, wherein $$z'_R = \frac{f_R^2}{z'_A + z'_{ob}},$$

wherein $z'_A$ is the distance from the conjugate plane of the aperture diaphragm of the photographic objective to the image focus $F'_{ob}$ of the photographic objective, wherein $$z'_{ob} = \frac{f_{ob}^2}{z_{ob}}$$

is the distance from the field diaphragm to the image focus $F'_{ob}$ of the photographic objective, wherein $f_{ob}$ is the focal length of the photographic objective, and wherein $z_{ob}$ is the distance from the object plane to the object focus $F_{ob}$ of the photographic objective.

3. The multiperspective photography camera device of claim 1, further comprising said photographic objective housed within and attached to the hollow housing, and arranged behind said front opening so that light coming from the macroscopic 3D scene passes first through the front opening, then through the photographic objective, then through the at least one converging lens and then through the lens array to impinge on the photosensitive pixel array sensor.

4. The multiperspective photography camera device of claim 3, further comprising said photosensitive pixel array sensor housed within and attached to the hollow housing, and arranged behind said lens array at a distance coincident with the focal distance $f_{ML}$ of the lenses of the lens array, wherein the photosensitive pixel array sensor comprises several groups of photosensitive elements, each group comprising a plurality of photosensitive elements facing a respective lens of the lens array to sense light of a respective perspective image of the macroscopic 3D scene.

5. The multiperspective photography camera device of claim 4, wherein each of said pluralities of photosensitive elements comprises at least 10,000 photosensitive elements.

6. The multiperspective photography camera device of claim 1, wherein said hollow casing further comprises a back opening for the exit of light coming from the lens array, and a back coupling arrangement for coupling the hollow casing to a camera body housing said photosensitive pixel array sensor, such that said back opening is optically communicated and aligned with an opening of said camera body and the lens array is distanced from the photosensitive pixel array sensor a distance coincident with the focal distance $f_{ML}$ of the lenses of the lens array.

7. The multiperspective photography camera device of claim 6, wherein the lens array is placed at a distance d from the at least one converging lens, wherein $d=f_R+z'_R$, wherein $$z'_R = \frac{f_R^2}{z'_A + z'_{ob}},$$

wherein $z'_A$ is the distance from the conjugate plane of the aperture diaphragm of the photographic objective to the image focus $F'_{ob}$ of the photographic objective, wherein $$z'_{ob} = \frac{f_{ob}^2}{z_{ob}}$$

is the distance from the field diaphragm to the image focus $F'_{ob}$ of the photographic objective, wherein $f_{ob}$ is the focal length of the photographic objective, and wherein $z_{ob}$ is the distance from the object plane to the object focus $F_{ob}$ of the photographic objective, and wherein the multiperspective photography camera device further comprises a front coupling arrangement for coupling the hollow casing to said photographic objective, such that said front opening is optically communicated and aligned with the same and the requested value of $z'_{ob}$ is achieved.

8. The multiperspective photography camera device of claim 3, wherein the lens array is placed at a distance d from the at least one converging lens, wherein $d=f_R+z'_R$, wherein $$z'_R = \frac{f_R^2}{z'_A + z'_{ob}},$$

wherein $z'_A$ is the distance from the conjugate plane of the aperture diaphragm of the photographic objective to the image focus $F'_{ob}$ of the photographic objective, wherein $$z'_{ob} = \frac{f_{ob}^2}{z_{ob}}$$

is the distance from the field diaphragm to the image focus $F'_{ob}$ of the photographic objective, wherein $f_{ob}$ is the focal length of the photographic objective, and wherein $z_{ob}$ is the distance from the object plane to the object focus $F_{ob}$ of the photographic objective, and wherein the multiperspective photography camera device further comprises a front separation distance adjustment mechanism to adjust the separation distance between the photographic objective and the field diaphragm so that the requested value of $z'_{ob}$ is achieved.

9. The multiperspective photography camera device of claim 3, wherein the lens array is placed at a distance d from the at least one converging lens, wherein $d=f_R+z'_R$, wherein $$z'_R = \frac{f_R^2}{z'_A + z'_{ob}},$$

wherein $z'_A$ is the distance from the conjugate plane of the aperture diaphragm of the photographic objective to the image focus $F'_{ob}$ of the photographic objective, wherein $$z'_{ob} = \frac{f_{ob}^2}{z_{ob}}$$

is the distance from the field diaphragm to the image focus $F'_{ob}$ of the photographic objective, wherein $f_{ob}$ is the focal length of the photographic objective, and wherein $z_{ob}$ is the distance from the object plane to the object focus $F_{ob}$ of the photographic objective, and wherein the multiperspective photography camera device further comprises a back separation distance adjustment mechanism to adjust the separation distance between the at least one converging lens and the lens array so that the requested value of $z'_R$ is achieved.

10. The multiperspective photography camera device of claim 1, wherein the lenses of the lens array are equidistantly separated a distance p between the centres of each two contiguous lenses.

11. The multiperspective photography camera device of claim 10, further comprising said photosensitive pixel array sensor housed within and attached to the hollow housing, and arranged behind said lens array at a distance coincident with the focal distance $f_{ML}$ of the lenses of the lens array, wherein the photosensitive pixel array sensor comprises several groups of photosensitive elements, each group comprising a plurality of photosensitive elements facing a respective lens of the lens array to sense light of a respective perspective image of the macroscopic 3D scene, and wherein said lens array is a J×J two-dimensional lens array, where preferably J≤5, and wherein the photosensitive pixel array sensor is formed by a two-dimensional pixel array of J×J groups of N×N photosensitive elements, where $N=p/\delta_p$, where $\delta_p$ is the size of each photosensitive element, or pixel.

12. The multiperspective photography camera device of claim 6, further comprising a processor operatively connected to the photosensitive pixel array sensor to receive output signals and process output signals coming therefrom and being representative of the plurality of different perspectives of the macroscopic 3D scene.

13. The multiperspective photography camera device of claim 6, further comprising a communication unit operatively connected to the photosensitive pixel array sensor to receive therefrom output signals being representative of the plurality of different perspectives of the macroscopic 3D scene, and being configured to transmit the received output signals to a remote processor configured to process said output signals.

14. The multiperspective photography camera device of claim 12, wherein said processor is configured to perform at least one of the following tasks, for static and dynamic scenes, by processing the received output signals: 3D image reconstruction of non-occluded and occluded objects, generation of depth maps, and ballistic photon signal strengthening.

15. The multiperspective photography camera device of claim 1, constituting a passive device configured to operate under ambient light.

* * * * *